(12) United States Patent
Johnson et al.

(10) Patent No.: US 8,177,188 B1
(45) Date of Patent: May 15, 2012

(54) VALVE MANIFOLD

(76) Inventors: John Leslie Johnson, Raleigh, NC (US);
James G. Johnson, Knotts Island, NC (US)

( * ) Notice: Subject to any disclaimer, the term of this patent is extended or adjusted under 35 U.S.C. 154(b) by 296 days.

(21) Appl. No.: 12/131,092

(22) Filed: Jun. 1, 2008

Related U.S. Application Data

(60) Division of application No. 10/223,236, filed on Aug. 19, 2002, now Pat. No. 7,490,625, which is a continuation-in-part of application No. 09/840,688, filed on Apr. 23, 2001, now Pat. No. 6,435,010.

(51) Int. Cl.
*F16K 31/00* (2006.01)

(52) U.S. Cl. ...................... 251/63.6; 251/63.5

(58) Field of Classification Search ............ 251/62, 251/63.5, 63.6
See application file for complete search history.

(56) References Cited

U.S. PATENT DOCUMENTS

| | | | |
|---|---|---|---|
| 1,224,221 A * | 5/1917 | Schwanebeck ............. 251/63 |
| 2,522,927 A | 9/1950 | Camerota |
| 3,331,237 A | 7/1967 | Strang |
| 3,577,768 A | 5/1971 | Aprill et al. |
| 3,862,738 A * | 1/1975 | Stumpmeier ............. 251/43 |
| 3,872,712 A | 3/1975 | Westervelt et al. |
| RE29,481 E | 11/1977 | Larner |
| 4,111,226 A | 9/1978 | Cameron |
| 4,172,582 A * | 10/1979 | Bobnar ............... 251/63 |
| 4,431,159 A * | 2/1984 | Stubbs ............. 251/63.6 |
| 4,531,540 A * | 7/1985 | Meister ............. 137/492.5 |
| 4,587,619 A | 5/1986 | Converse, III et al. |
| 4,639,196 A * | 1/1987 | Kirkland, Jr. ........... 417/228 |
| 4,896,694 A * | 1/1990 | Rausch .............. 137/491 |
| 5,046,519 A | 9/1991 | Stenstrom et al. |
| 5,072,621 A | 12/1991 | Hasselmann |
| 5,295,391 A | 3/1994 | Mastandrea et al. |
| 5,295,392 A | 3/1994 | Hensel et al. |
| 5,440,918 A | 8/1995 | Oster |
| 5,540,083 A | 7/1996 | Sato et al. |
| 5,546,789 A | 8/1996 | Balke et al. |
| 5,557,965 A | 9/1996 | Fiechtner |
| 5,678,595 A * | 10/1997 | Iwabuchi ............ 137/341 |
| 5,783,561 A * | 7/1998 | Horwitz et al. ........... 514/2.7 |
| 5,898,105 A | 4/1999 | Owens |
| 6,073,651 A * | 6/2000 | Conrads et al. ........... 137/556 |
| 6,142,164 A * | 11/2000 | Wier et al. ............ 137/15.04 |
| 6,668,854 B2 * | 12/2003 | Fukuda ............. 137/341 |
| 6,805,152 B2 * | 10/2004 | Kanzaka et al. ........... 137/341 |
| 6,895,986 B2 * | 5/2005 | Wieder ............... 137/14 |
| 7,011,295 B2 * | 3/2006 | Kajitani ............. 251/335.3 |
| 7,322,557 B2 * | 1/2008 | Nagao et al. ............ 251/63.5 |

FOREIGN PATENT DOCUMENTS

JP 58180877 A 10/1983

\* cited by examiner

*Primary Examiner* — John Fristoe, Jr.
(74) *Attorney, Agent, or Firm* — Carlson, Gaskey & Olds, P.C.

(57) ABSTRACT

A valve manifold includes a valve body carrying pairs of laterally spaced piston actuated valves controlled by control modules operative to selectively pressurize and exhaust an outlet port connected to a fluid device and configured in groupings permitting varying valve functionalities.

30 Claims, 18 Drawing Sheets

| OPERATION (FOR HIGH AND LOW PRESSURE LEAK TEST LINE) | HIGH PRESSURE POPPET (CONTROLLED BY A NORMALLY OPEN PILOT VALVE) | | LOW PRESSURE POPPET (CONTROLLED BY A NORMALLY OPEN PILOT VALVE) | | HIGH PRESSURE POPPET (CONTROLLED BY A NORMALLY OPEN PILOT VALVE) | | LOW PRESSURE POPPET (CONTROLLED BY A NORMALLY OPEN PILOT VALVE) | |
|---|---|---|---|---|---|---|---|---|
|  | PILOT VALVE SOLENOID | POPPET POSITION | PILOT VALVE SOLENOID | POPPET POSITION | PILOT VALVE SOLENOID | POPPET POSITION | PILOT VALVE SOLENOID | POPPET POSITION |
| PRESSURE IN "HIGH" AND "LOW" INLET PORTS ONLY | OFF | CLOSED | OFF | CLOSED | OFF | CLOSED | OFF | CLOSED |
| SYSTEM CHARGED WITH HIGH PRESSURE | ON | OPEN | OFF | CLOSED | ON | CLOSED | OFF | OPEN |
| FLOW DIRECTED THROUGH FLOW SENSOR FOR LEAK DISPLAY | ON | OPEN | OFF | CLOSED | ON | CLOSED | ON | CLOSED |
| PRESSURE DUMPED FROM SYSTEM | OFF | CLOSED | OFF | CLOSED | OFF | OPEN | OFF | OPEN |
| SYSTEM CHARGED WITH LOW PRESSURE | OFF | CLOSED | ON | OPEN | ON | CLOSED | OFF | OPEN |
| FLOW DIRECTED THROUGH FLOW SENSOR FOR LEAK DISPLAY | OFF | CLOSED | ON | OPEN | ON | CLOSED | ON | CLOSED |
| PRESSURE DUMPED FROM SYSTEM | OFF | CLOSED | OFF | CLOSED | OFF | OPEN | OFF | OPEN |

FIG. 11

VALVE MANIFOLD

RELATED APPLICATION

This application is a divisional application of U.S. Utility application Ser. No. 10/223,236, filed on Aug. 19, 2002, which is a continuation-in-part application of U.S. Ser. No. 09/840,688, filed on Apr. 23, 2001 in the names of Johnson et al. and entitled "Leak Detection System".

FIELD OF THE INVENTION

The present invention relates to valves for controlling fluid flow, and, in particular, a control valve assembly having valves integrated with a valve manifold for compactly controlling fluid coupled devices

BACKGROUND OF THE INVENTION

Manufacturers of hydraulic, pneumatic, and containment equipment customarily test the fluid integrity of their components to ensure safe operation in the field. Standards are generally prescribed for leakage rates at test pressures and times correlated to the desired component specifications.

Currently, leak detection systems are an assembly of separate components housed in portable test units. Using a myriad of valves and pneumatic lines a component to be tested is attached to the test unit and independent valves are sequenced to route pressurized fluid, customarily air, to the component, which is then isolated. The leakage rate at the component is then measured and a part accepted or rejected based thereon. The multiple valves and lines may be integrated into a portable test stand for on-site testing. Nonetheless, the pneumatic system is expansive and cumbersome, with each element posing the potential for associated malfunction and leaks. Further, automation of a testing protocol is difficult because of the independent relationship of the components. Where varying test pressures are required for other components, the system must be retrofitted for each such use.

For example, the leak detection apparatus as disclosed in U.S. Pat. No. 5,898,105 to Owens references a manually operated systems wherein the testing procedures is controlled by plural manual valves and associated conduit occasioning the aforementioned problems and limitations.

Similarly, the hydrostatic testing apparatus as disclosed in U.S. Pat. No. 3,577,768 to Aprill provides a portable unit comprised of a plurality of independent valves and associated lines for conducting testing on equipment and fluid lines. The valves are manually sequenced for isolating test components from a single pressure source. U.S. Pat. No. 5,440,918 to Oster also discloses a testing apparatus wherein a plurality of conventional valving and measuring components are individually fluidly connected.

Remotely controlled leak detection systems, such as disclosed in U.S. Pat. No. 5,557,965 to Fiechtner, have been proposed for monitoring underground liquid supplies. Such systems, however, also rely on an assembly of separate lines and valves. A similar system is disclosed in U.S. Pat. Nos. 5,046,519 to Stenstrom et al. 5,072,621 to Hasselmann.

U.S. Pat. No. 5,540,083 to Sato et al. discloses remotely controlled electromagnetically operated valves for measuring leakage in vessels and parts. Separate valve and hydraulic lines are required.

In an effort to overcome the foregoing limitations, it would be desirable to provide a portable leakage detection system for testing the fluid integrity of fluid systems and components that include integrated valving and porting within a compact envelope for automatically controlling a variable testing protocol. The leak detector includes a valve block having internal porting selectively controlled by four identical and unique pneumatic poppet valves for pressurizing the test part, isolating the test part for determining leakage rates with pressure and flow sensors communicating with the porting, and exhausting the test line upon completion of the leakage test. The poppet valves engage valve seats incorporated within the porting. The poppet valves are actuated by pilot valve pressure acting on a pilot piston to effect closure of the valve. The sensors interface with a microprocessor for comparing measurements with the test protocol and indicate pass or fail performance. Upon removal of the pilot valve pressure, the resident pressure in the porting shifts the valve to the open position. The leak detector includes plural inlets for accommodating variable pressure protocols. The leak detector thus eliminates the need for external fluid connections and conduits between the various detector components, eliminates the need for two-way valving actuation, and provides for connection with external test units with a single, easy to install, pneumatic line.

In another aspect of the invention, the poppet valves may be disposed in sets in a valve manifold to simulate conventional valve functionalities with a plurality of fluidic devices. For three way valve functionality, a pair of the pitot valves operates in controlled phased opposition to apply and vent pressure to a one way actuator. For four way valve functionality, a second set of oppositely configured valve are used for conventional operation of dual controlled devices such as two way actuators.

BRIEF DESCRIPTION OF THE DRAWINGS

The above and other objects and advantages of the present invention will become apparent upon reading the following detailed description taken in conjunction with the accompanying drawings in which:

FIG. 11 is a truth table for the leak detection system;

DETAILED DESCRIPTION OF THE PREFERRED EMBODIMENTS

Figure 1:
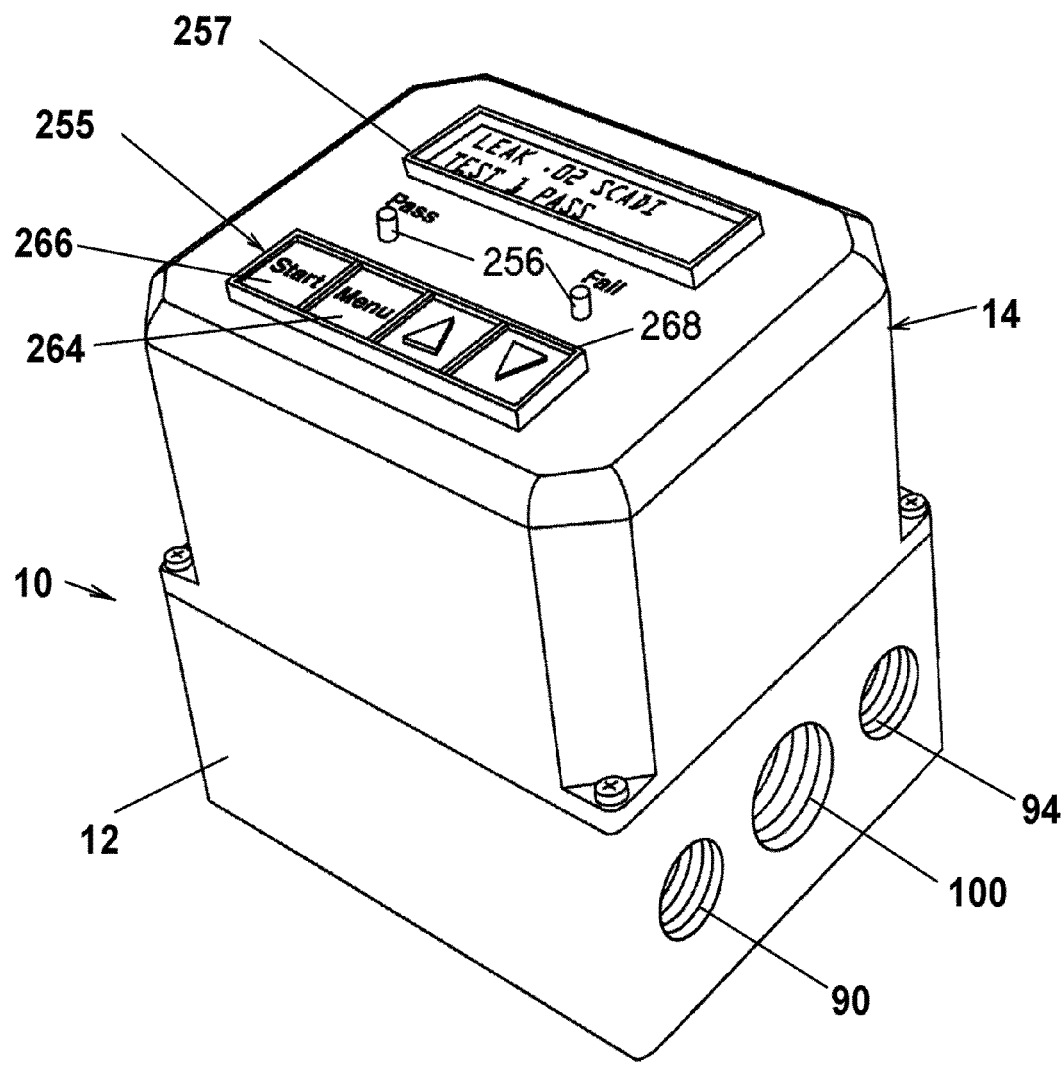
FIG. 1 is a perspective view of a leak detection valve assembly and control module in accordance with an embodiment of the invention.
Figure 2:
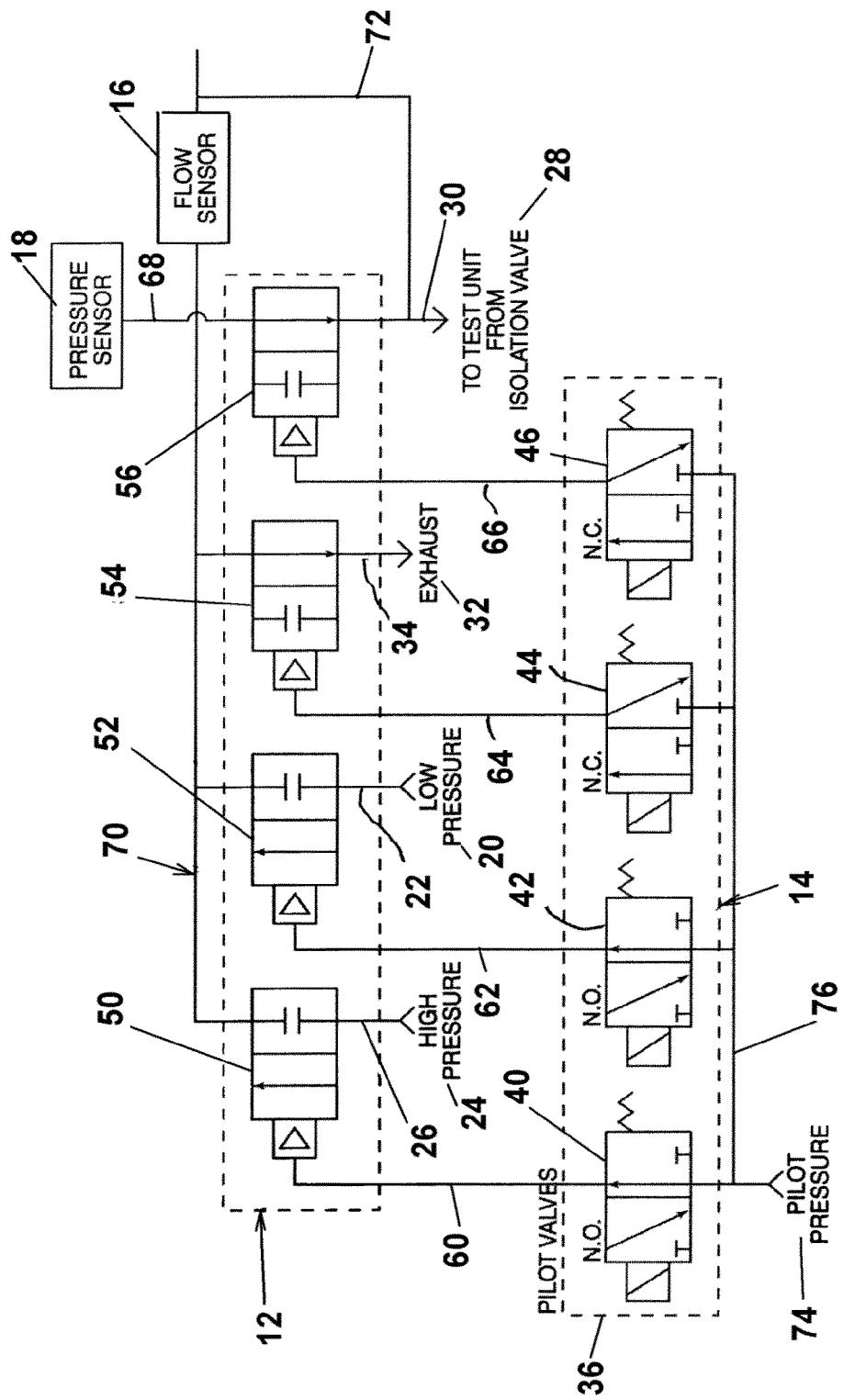
FIG. 2 is a schematic drawing of a leak detection system incorporating the valve assembly of FIG. 1.

Referring to the drawings for the purpose of describing the preferred embodiment and not for limiting same, FIGS. 1 and 2 illustrate a leak detection system 10 for determining the pressure integrity of components when subjected to pressure conditions during a test period. The leak detection system 10 comprises a valve assembly 12 and a control module 14 operatively coupled with a flow sensor 16 and pressure sensor 18. As hereinafter described in detail, the leak detector 10 is operative for testing the fluid integrity of test parts to determine is leakage standards are being achieved.

Figure 10:
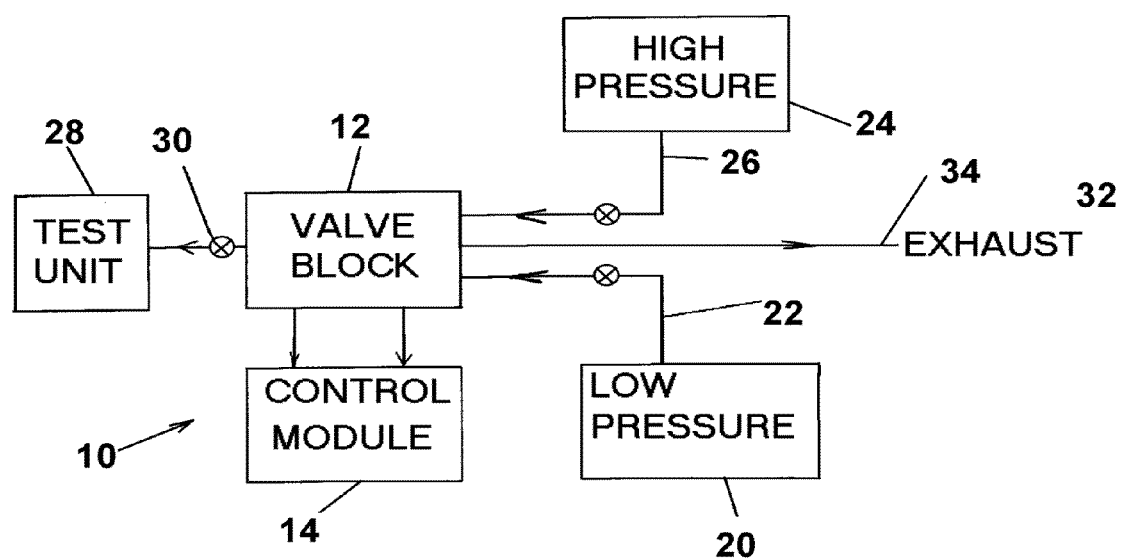
FIG. 10 is a schematic diagram of the leak detection system.

Referring additionally to FIG. 10, the valve assembly 12 is fluidly connected with a low pressure source 20 along line 22, a high pressure source 24 along line 26, a test unit 28 for testing such parts along line 30, and an exhaust 32 along line 34. Supplemental valves may be disposed in the lines for controlling flow therethrough.

The control module 14 comprises a pilot valve assembly 36 including pilot valves 40, 42, 44, and 46 fluidly connected with a high pressure valve unit 50, a low pressure valve unit 52, an exhaust valve unit 54 and an isolation valve unit 56 along lines 60, 62, 64 and 66, respectively. The pressure sensor 18 is coupled with the isolation valve unit 56 by line 68. The flow sensor 16 is connected with the valve units at manifold line 70 and with test part line 30 along line 72. The pilot valves are connected to pilot pressure 74 by manifold line 76. The lines and attendant fittings will vary in accordance with the parts undergoing testing and the test conditions.

Referring to FIGS. 3 through 8, the valve assembly 12 comprises a valve block 40 housing via ports to be described below a low pressure valve unit 80, a high pressure valve unit 82, an exhaust valve unit 84 and an isolation valve unit 86.

Figure 4:
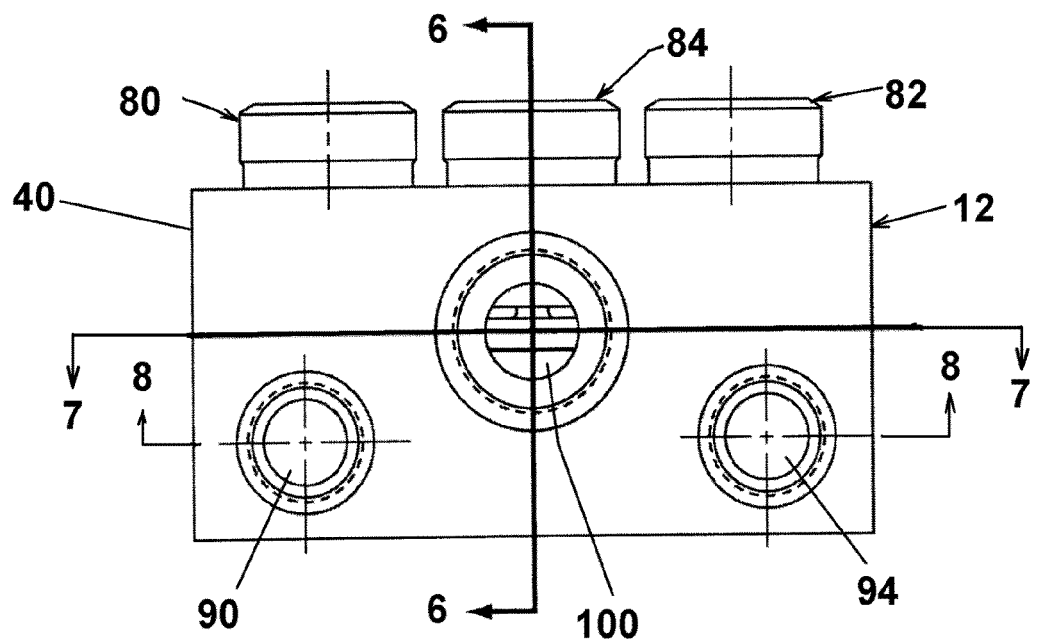
FIG. 4 is a front view of the valve assembly.
Figure 5:
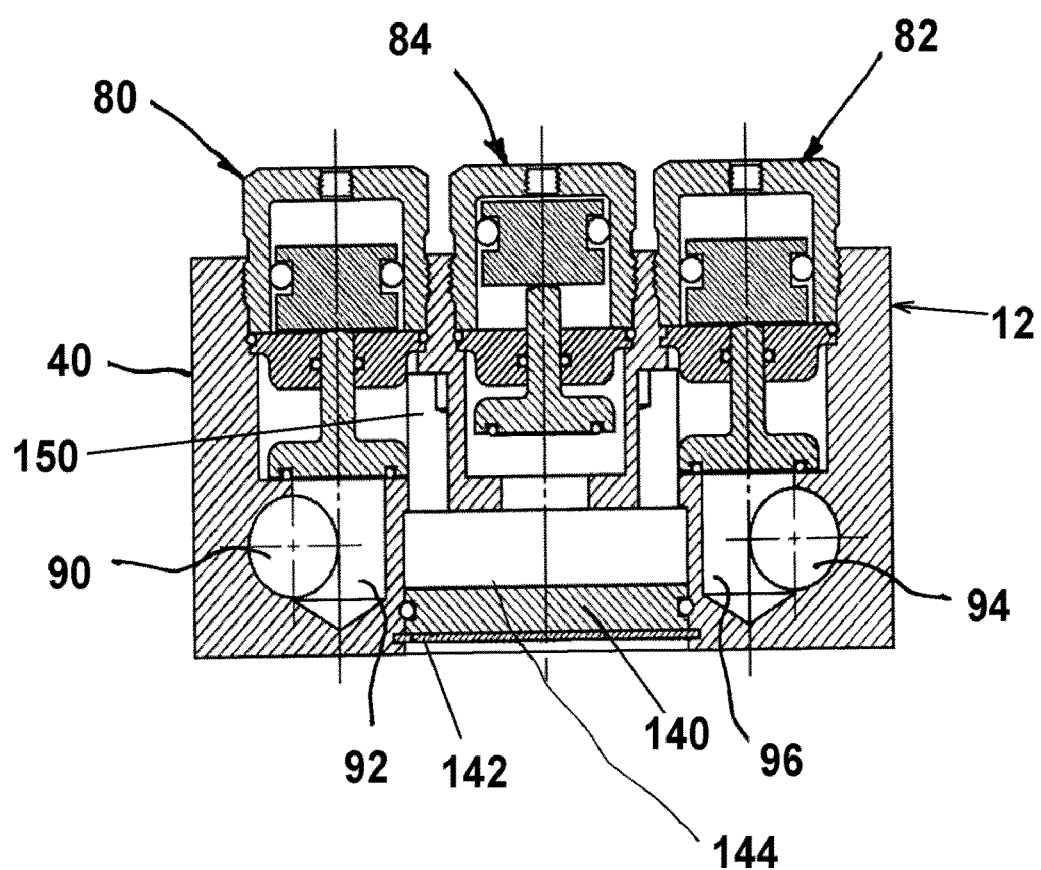
FIG. 5 is a vertical cross sectional view taken along line 5-5 in FIG. 3.
Figure 6:
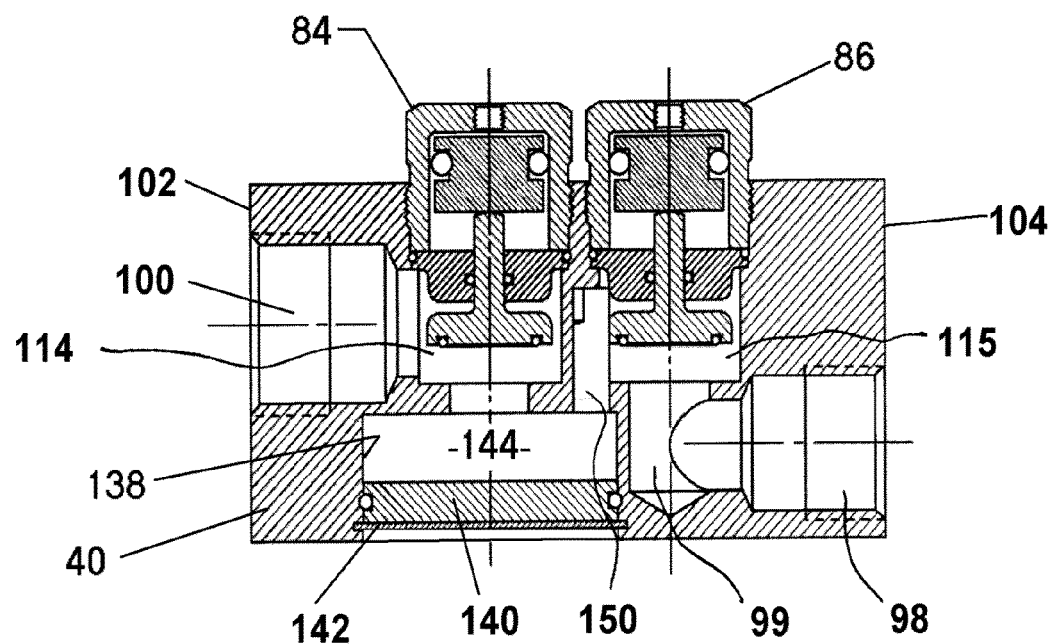
FIG. 6 is a vertical cross sectional view taken along line 6-6 in FIG. 4.
Figure 8:
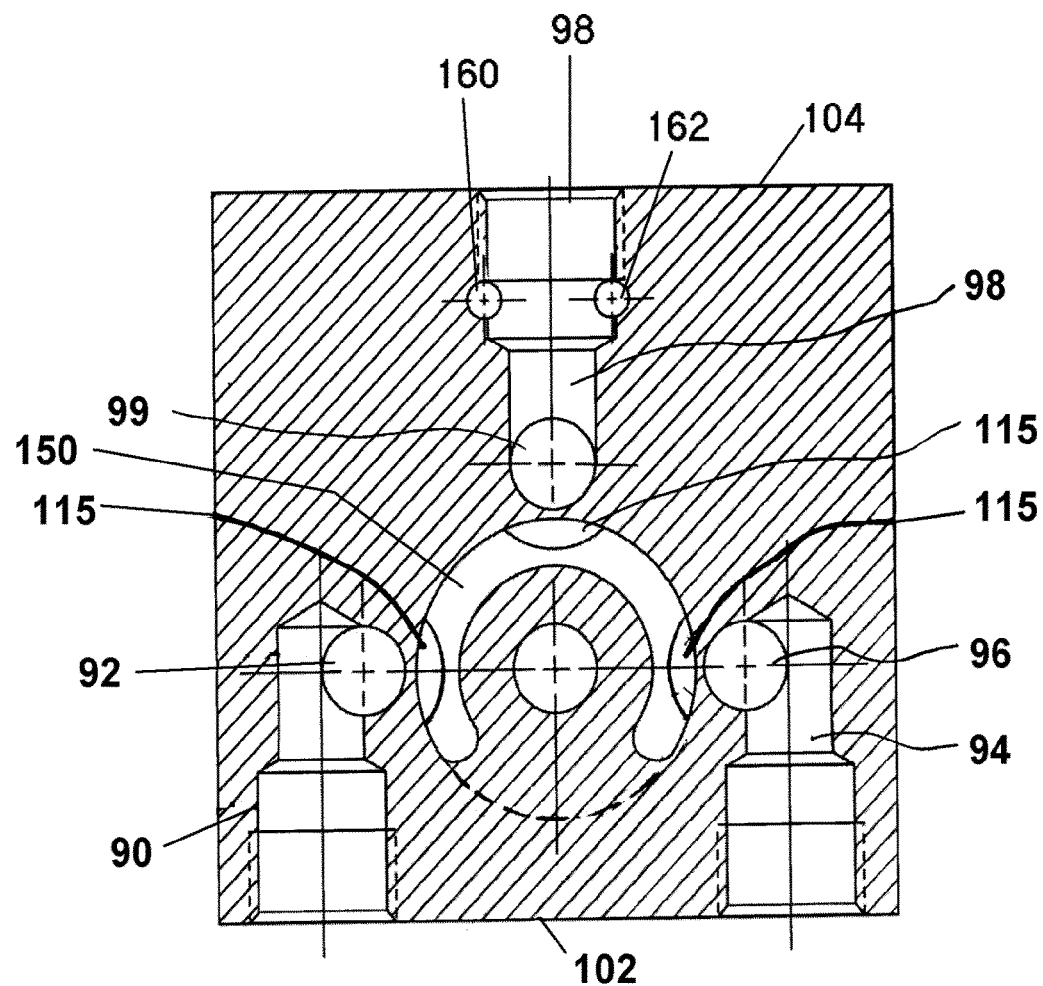
FIG. 8 is a horizontal cross sectional view taken along line 8-8 in FIG. 4.

As shown in FIGS. 5 and 8, the low pressure valve unit 80 is fluidly connected with line 28 and low pressure source 20 by a low pressure inlet port 90 intersecting with a vertical cross port 92. The high pressure valve unit 82 is fluidly connected with line 26 and high pressure source 24 by a high pressure inlet port 94 intersecting with a vertical cross port 96. As shown in FIG. 6, the isolation valve unit 86 is fluidly connected with the line 30 by exhaust port 98 and vertical port 99. The exhaust valve unit 84 is fluidly connected with line 32 by exhaust port 100. As shown in FIG. 4, the ports 90, 94 and 100 are disposed on the front face 102 of the valve block 12. The isolation port 98 is disposed on the rear face 104 of the valve block 12. The ports 100 and 98 are located laterally in a central vertical plane. The ports 90 and 94 are symmetrically disposed on opposite sides of the exhaust port 100 and therebelow. The ports 100, 94 and 90 lie in a common horizontal plane. Each of the ports is provided with an outer threaded bore for connection to the associated lines with an appropriate fitting for the fluid application.

Figure 9:
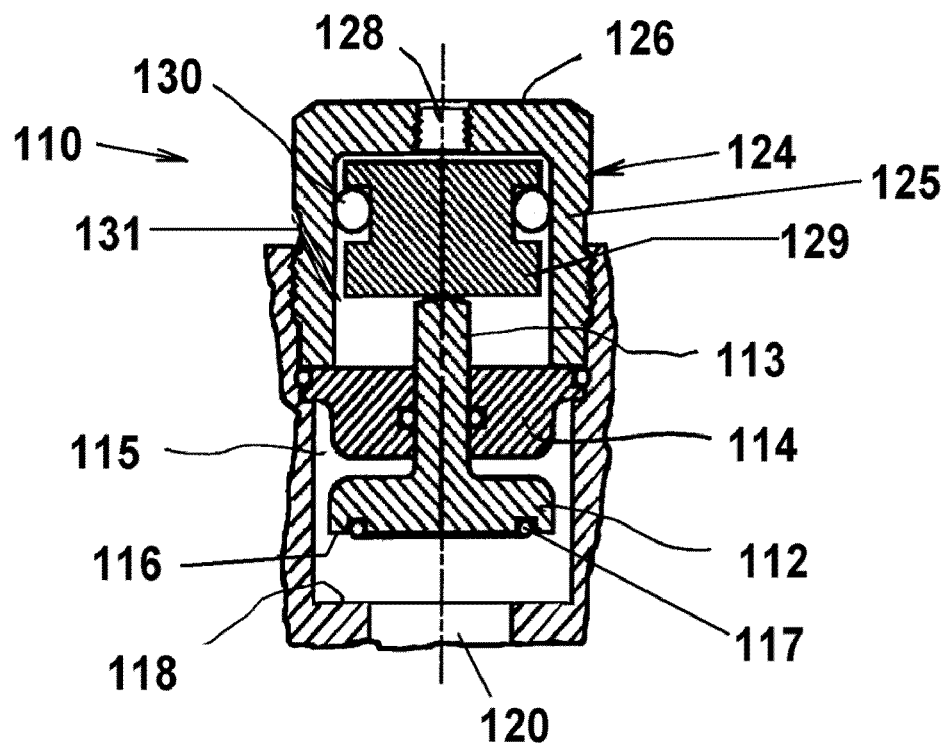
FIG. 9 is a fragmentary cross sectional view of a unique poppet valve assembly.

All of the valve units have a common architecture as representatively shown in FIG. 9. Therein, a valve unit 110 including a poppet 112 having a valve stem 113 supported by sealing disk 114 for reciprocation between a raised vent position as illustrated and a lowered sealed position in counterbore 115. The poppet 112 includes a cylindrical valve body 116 carrying O-ring 117 that engages the annular valve seat 118 of counterbore 115 formed coaxially with a vertical port 120. The outer rim of the sealing disk 114 is supported at the base of a secondary counterbore vertically above bore 115. The secondary counterbore outwardly terminates at an internally threaded end. A vent cap 124 includes a cylindrical sleeve 125 threadedly received in the threaded bore and a circular base 126 having a threaded center hole 128. An actuating piston 129 including O-ring 130 is axially slidably carried at the interior surface of the sleeve of the vent cap 124 for movement between a raised position engaging the base 128 and a lowered position engaging the top of the valve stem 113 for moving the poppet 112 to the sealed condition. Angularly disposed vent holes 131 are formed in the sleeve 125 for venting the piston. An air line connected with the pilot pressure line is connected at the center hole 128 for connection with the pilot pressure control system.

In typical operation, when pilot pressure is applied in the chamber above the piston 129, the piston 129 is forced downwardly thereby shifting the poppet 112 to the sealed position. When the pilot pressure is removed and the port 120 is pressurized, the poppet 112 and the piston 129 are driven to the raised, open position. Assist springs may be deployed, particularly in the isolation valve, for providing additional biasing to the open condition.

As shown in FIGS. 5 through 8, with respect to the exhaust port 100 and valve unit 84, a counterbore 138 is formed in the bottom surface of the valve block 40 coaxially therewith. A circular sealing blank 140 is retained at a step in the counterbore 138 by a split retaining ring 142 retained in a corresponding annular groove thus defining a pressure chamber 144. A C-shaped distribution channel or port 150 extends from the chamber 144 upwardly and intersects the counterbores 115 of valve units 110.

Figure 3:
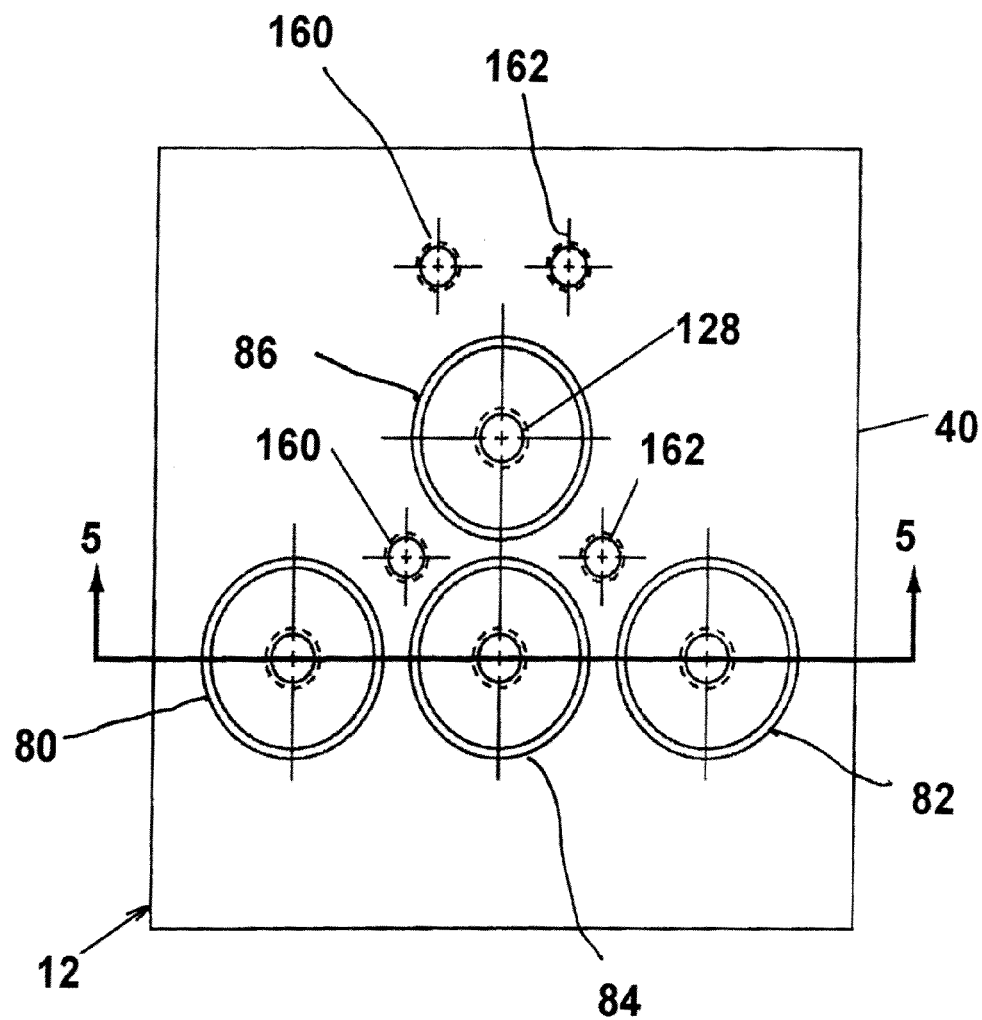
FIG. 3 is a top view of the valve assembly.
Figure 7:
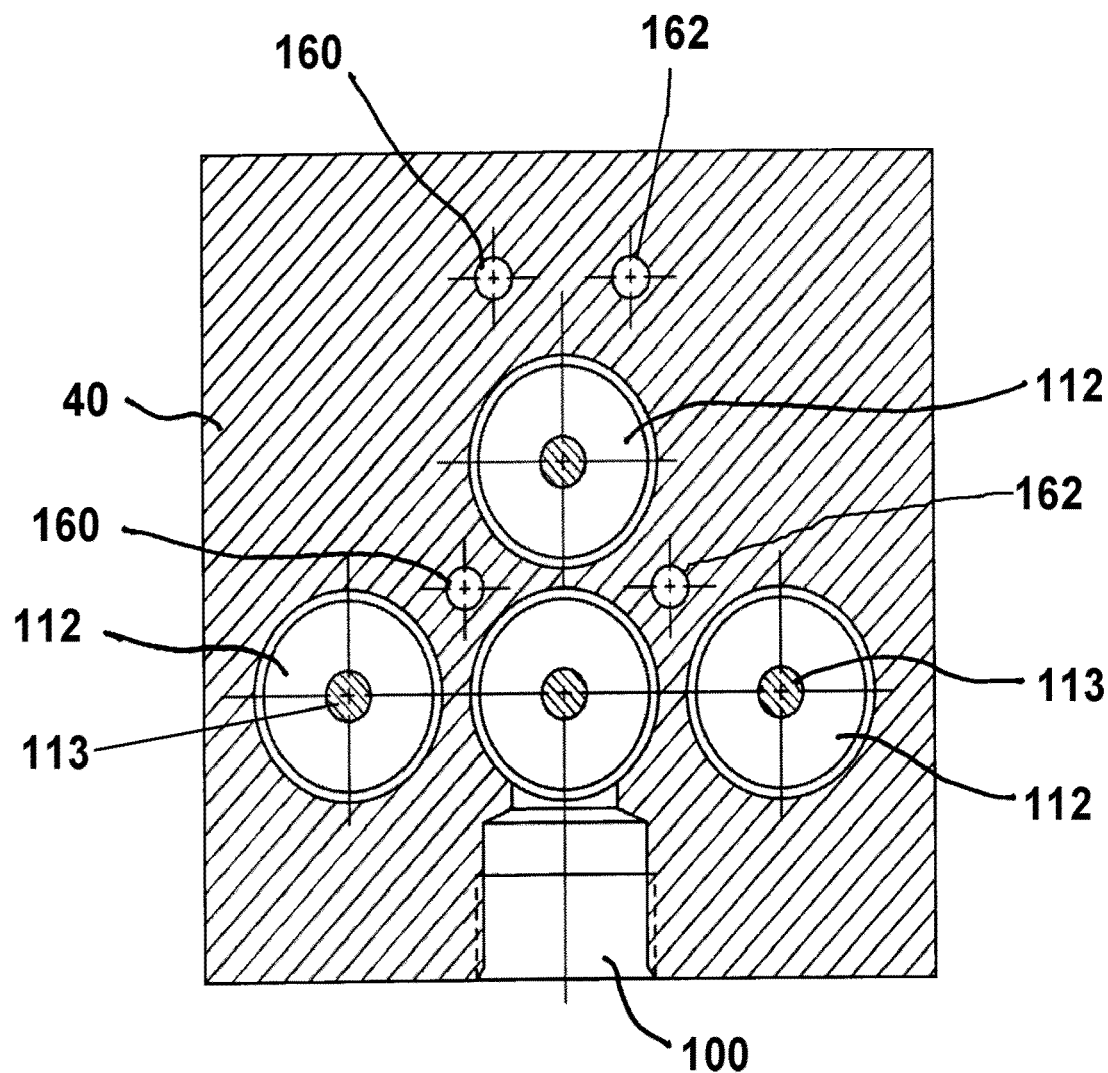
FIG. 7 is a horizontal cross sectional view taken along line 7-7 in FIG. 4.

Accordingly, when either of the pressure valve units is pressurized from its source and the pilot control to the piston is interrupted, the air flow in the ports 92, 96, 99 shifts the poppets to raised, open positions, thereby pressurizing the distribution port 150 and chamber 144 resulting in pressure communication therebetween. Referring to FIGS. 3, 7 and 8, a pair of vertical ports 160 communicate upstream of the isolation valve unit 84 for connecting one line of the flow sensor 16 and the pressure sensor 18. A pair of vertical ports 162 communicates on the other side of the isolation valve units 84 with the distribution port 150. Accordingly, the flow sensor 16 in a conventional manner measures pressure transients on the part under leakage test while the pressure sensor 18 measures pressure conditions on both sides of the isolation valve.

The valve unit is operationally connected to an independent test unit whereat parts to be leak tested may be deployed. The test protocol may specify a high pressure test for a defined test period or a low pressure test for a defined test period. Test parts are deemed successful if the leakage under pressure as determined by the flow sensor 16 is below a predetermined threshold. The control system 14 is effective for establishing the appropriate protocol.

Figure 12:
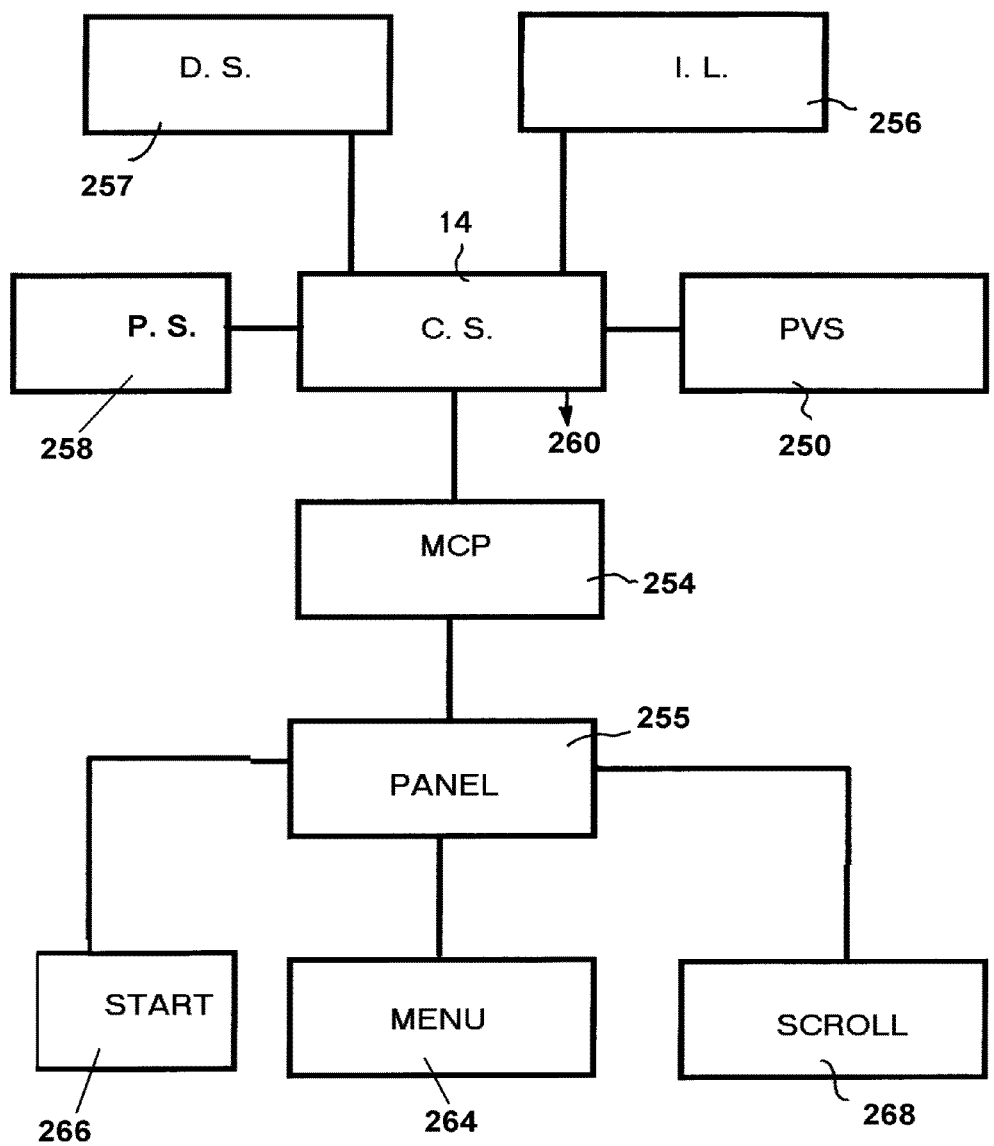
FIG. 12 is a schematic diagram for the control system for the leak detection system.

Referring to FIG. 12, the control system 14 comprises the pilot valve system 250, a microprocessor 254 coupled with a control panel 255 for defining and conducting the test protocol, test result indicator lights 256 a display screen 257, for denoting passing or failing of the test connected to a suitable power supply 258. The microprocessor 254 contains the protocols for the various parts, preferably programmed through an external computer port 260. The desired protocol is accessed at control panel 255 through menu button 264, start button 266 and scroll buttons 268.

The operation of the leak detector is illustrated in the truth table of FIG. 11 and taken in conjunction with the schematic of FIG. 2.

A part to be tested in mounted in the test fixture, the control system initialized and the test protocol selected. Thereafter, the test is initiated by actuating the start button 266. As a first condition, the high and low pressure lines are pressurized with the accompanying pilot valves 40, 42 in the normally open positions with the solenoids deenergized. This applies pilot pressure to the associated poppets to close and seal the high pressure and low pressure valve units 50, 52. Correspondingly, the normally closed exhaust pilot is deenergized and the exhaust valve 54 is in the open position. The normally closed isolation pilot is deenergized and the isolation valve unit 56 is in the open position.

Thereafter the high pressure pilot 40 is energized, venting the high pressure poppet whereby inlet high pressure air raises the high pressure valve unit 50 to the open position. Concurrently, the exhaust solenoid is energized admitting pilot pressure to the exhaust poppet piston chamber and shifting the exhaust valve unit 54 to the closed position and air flowing past the high pressure poppet pressurizes the exhaust chamber 144 through the distribution channel and past the isolation valve unit 56 to pressurize the test part with high pressure air. Thereafter, the isolation pilot is energized applying pilot pressure to the isolation piston chamber and closing the isolation poppet. Thereafter, the flow sensor 16 monitors pressure transients and through the microprocessor interface denotes pass or fail conditions at the indicator lights.

Upon completion of the test, the isolation pilot solenoid is deenergized pressurizing the high pressure piston and sealing the high pressure valve seat, thereby ceasing inlet flow. Concurrently, the isolation and exhaust pilot solenoids are deenergized allowing exhaust chamber and part pressure to shift the exhaust and isolation valves to the open position for completion of the test. In the event of excessive pressure lost at the test part, a light biasing spring may be provided at the isolation poppet to ensure movement to the open position.

For testing under low pressure conditions, the exhaust poppet is closed and the low pressure valving sequenced in similar fashion to the high pressure test detailed above. More particularly, a part to be tested in mounted in the test fixture, the control system initialized and the test protocol selected. Thereafter, the test is initiated by actuating the start button 266. As a first condition, the high and low pressure lines are pressurized with the accompanying pilot valves in the normally open positions with the solenoids deenergized. This applies pilot pressure to the associated poppets to close and seal the later. Correspondingly, the normally closed exhaust pilot is deenergized and the exhaust poppet is in the open position. The normally closed isolation pilot is deenergized and the isolation poppet is in the open position.

Thereafter the low pressure pilot 42 is energized, venting the low pressure valve whereby inlet low pressure air raises the low pressure valve unit 52 to the open position. Concurrently, the exhaust pilot is energized admitting pilot pressure to the exhaust poppet piston chamber and shifting the exhaust valve unit 54 to the closed position and air flowing past the low pressure poppet pressurizes the exhaust chamber through the distribution channel 150 and past the isolation poppet to pressurize the test part with high pressure air. Thereafter, the isolation pilot solenoid is energized applying pilot pressure to the isolation piston chamber and closing the isolation poppet. Thereafter, the flow sensor monitors pressure transients and through the microprocessor interface denotes pass or fail conditions at the indicator.

Upon completion of the test, the isolation pilot is deenergized pressurizing the low pressure piston and sealing the low pressure valve seat, thereby ceasing inlet flow. Concurrently, the isolation and exhaust pilot solenoids are deenergized allow exhaust chamber and part pressure to shift the exhaust and isolation poppets to the open position for completion of the test.

Figure 13:
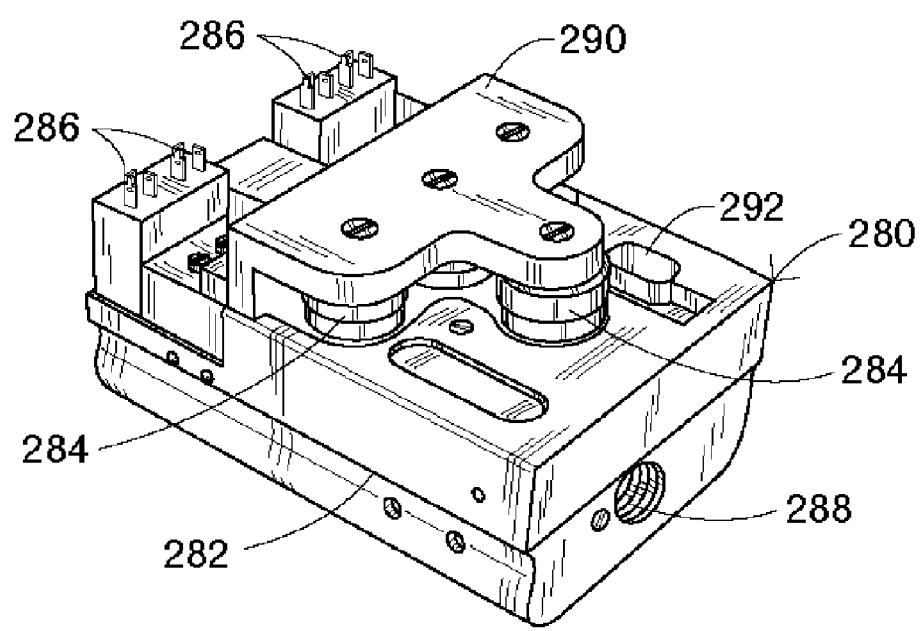
FIG. 13 is a perspective view of another embodiment of a valve assembly for a leak detection system.
Figure 14:
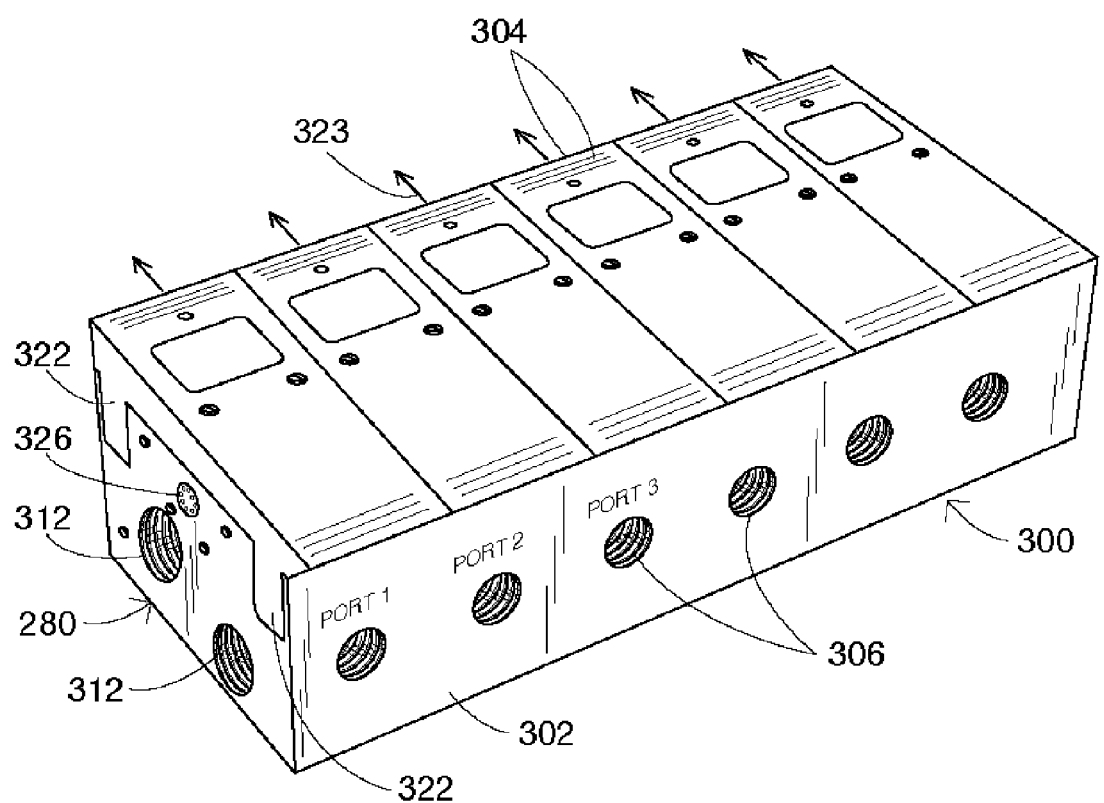
FIG. 14 is a perspective view of a valve manifold assembly in accordance with another embodiment of the invention.
Figure 15:
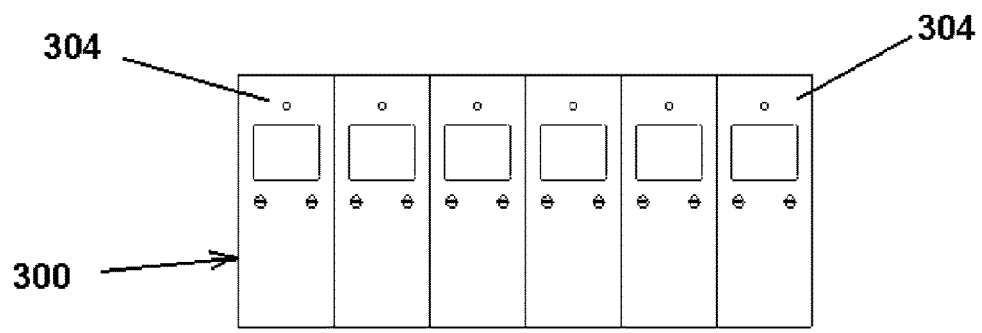
FIG. 15 is a top view of the valve manifold assembly shown in FIG. 14.
Figure 16:
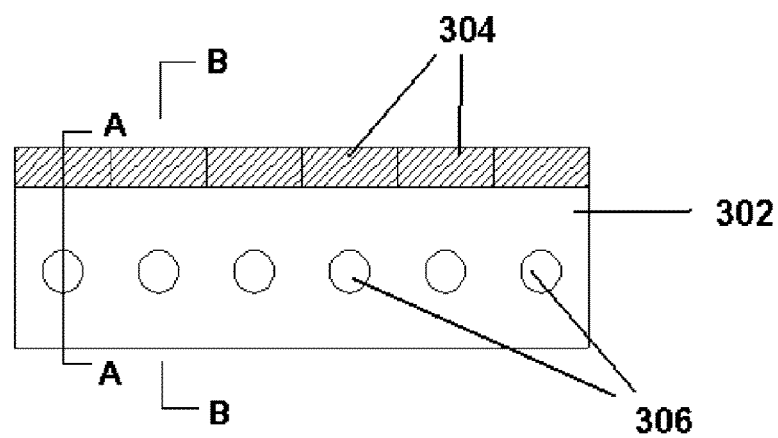
FIG. 16 is a front view of the valve manifold assembly shown in FIG. 14.
Figure 17:
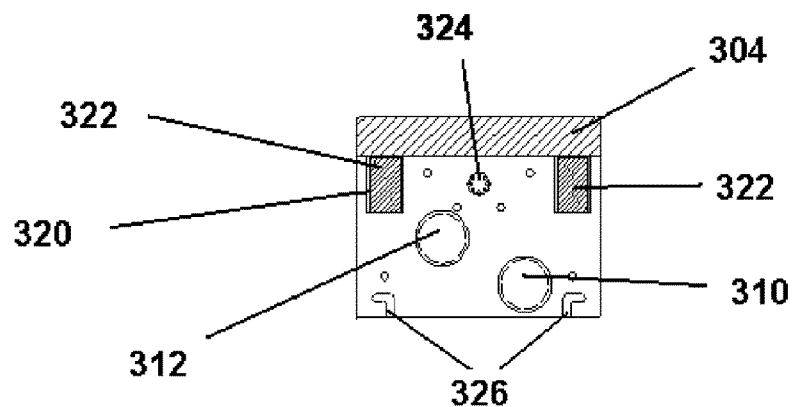
FIG. 17 is a left end view of the valve manifold assembly shown in FIG. 14.

Referring to FIG. 13, a fully integrated package is illustrated for a leak detection valve 280 as described above. The valve 280 comprises an extruded metallic valve body 282 having four valve assemblies 284, as described above. The valve assemblies are controlled by solenoids 286 carried on a top horizontal surface. The valve body 280 has an isolation port 288 in the illustrated rear wall thereof, and high and low pressure ports, and an exhaust port in the front wall thereof, which are not shown and function as above described. The control lines for the valve assemblies 284 are routed through a distribution bracket 290. The interior pressure sensors are coupled at pin connector 292 on the top surface of the valve body 280 for operative connection to associated instrumentation.

Referring to FIGS. 14 through 17, in another embodiment of the invention the valving is incorporated into a control valve manifold 300. The manifold 300 includes an extruded lower valve body 302 carrying on a top surface a plurality of longitudinally spaced control modules 304 for operatively controlling conventional fluidic devices, not shown, coupled at a longitudinal series of associated outlet ports 306 exiting at a longitudinal side wall of the valve body. An inlet port 310 and an exhaust port 312 extend longitudinally through the valve body 302 in parallel spaced relationship for interconnection with the valving as described in greater detail below.

The ports 310 and 312 terminate at internally threaded ends. At the remote end, the ports are suitably sealed with a stop member, such as a threaded plug (not shown), or coupled with a succeeding manifold. The inlet port 310 is coupled with a supply line for supplying inlet fluid under pressure for control by the valving and controlled operation of the associated fluidic devices. The exhaust port 312 is coupled with an exhaust line for routing to an appropriate location the exhaust fluid.

A pair of upwardly opening laterally spaced longitudinal channels 320 are formed in the top surface of the valve body 302. Solenoids 322 are carried in the channels 320 and operatively associated with the control modules 304 for controlling pilot pressure to the valving at pilot lines 324. The modules 304 are connected to a suitable power source via multiple-pin socket connector 326 carried on the front lateral side wall of the valve body 302. The valve modules 304 control the flow between the ports 310, 312 and the operative outlet ports 306 of the manifold 300. If certain of the ports are not required for an application, the outlet ports may be plugged or capped, and additionally the associated control module deleted. Any ports associated with the inactive outlet ports are also deleted or plugged.

It will also be apparent that the length of the valve body may be tailored to the devices to be controlled and may be coupled in series or parallel with other valving manifolds.

The manifold in controlled formats may be advantageously employed to replicate the functionality of various conventional valving configurations, such as two-way, three-way, four-way, five way valves. In such configurations, the manifold operates with lower control pressures within a substantially smaller envelope.

Figure 18:
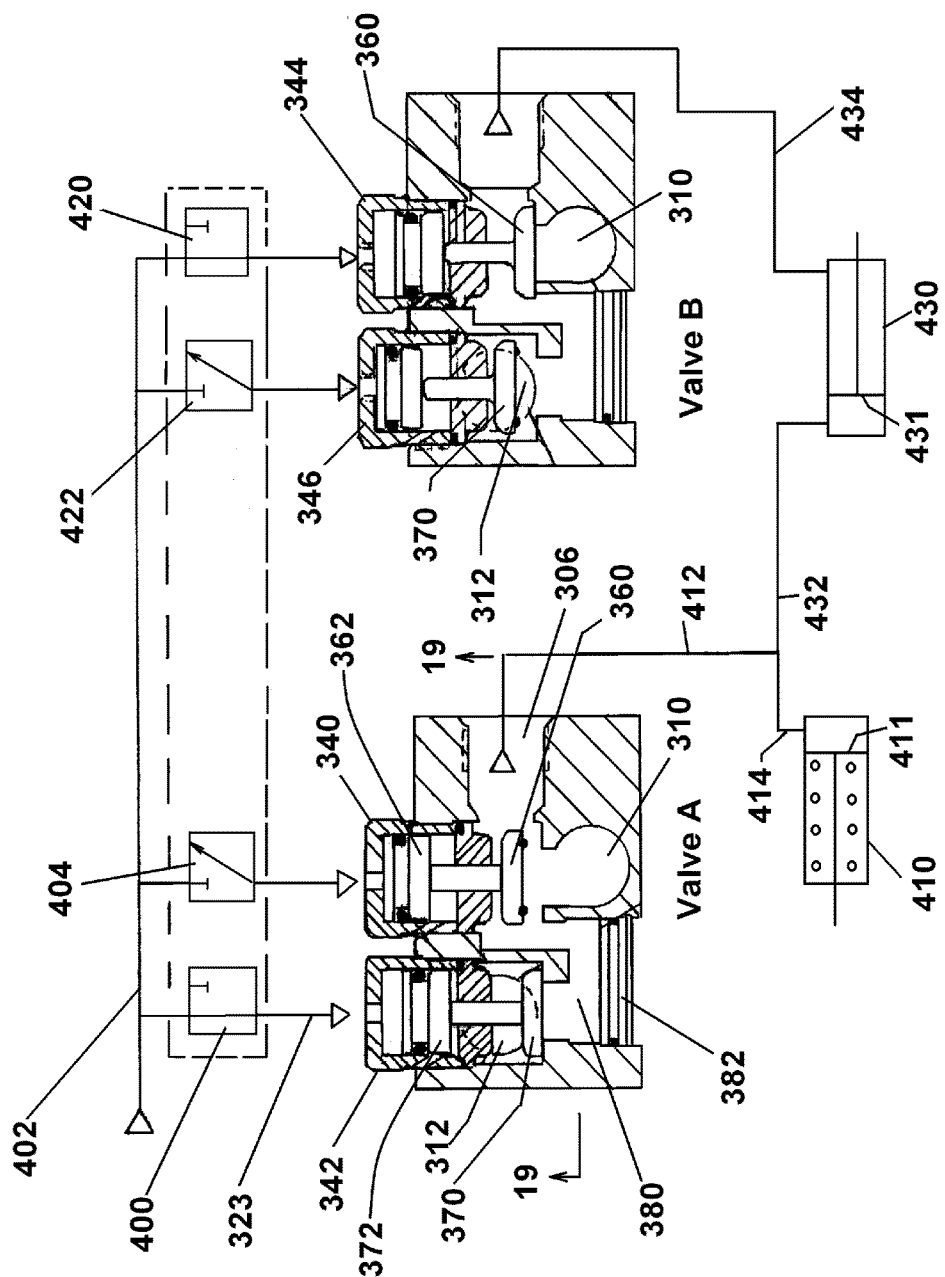
FIG. 18 is a cross sectional view of the valve manifold assembly shown in FIG. 14, with the control module removed and including cross sectional view of valve sets taken along lines A-A and B-B in FIG. 16 and a schematic view of the control system for the valve sets for three way and four way valve functionality.

More particularly, as shown in FIG. 18, each control module 304 is associated with a pair of laterally spaced valves 340, 342 in Valve A and valves 344 and 346 in Valve B. The valves are operatively disposed in the valve body 302 as referenced in FIG. 9 above.

The inlet valves 340 344 are disposed in upwardly opening vertical bores in the valve body normal to the inlet port 310. Each valve includes a slidably stem supported inlet valve member 360 downwardly moveable by a floating piston 362 from a raised position communicating with the inlet port 310 and a closed position engaging an annular valve seat downstream of the inlet port.

The exhaust valves 342, 346 are disposed in upwardly opening vertical bodes in the valve body normal to the exhaust port 312. Each valve includes a slidably stem supported outlet valve member 370 downwardly moveable by a floating piston 372 from a lowered position engaging an annular valve seat upstream of the exhaust port 312 and a raised position communicating with the exhaust port.

Figure 19:
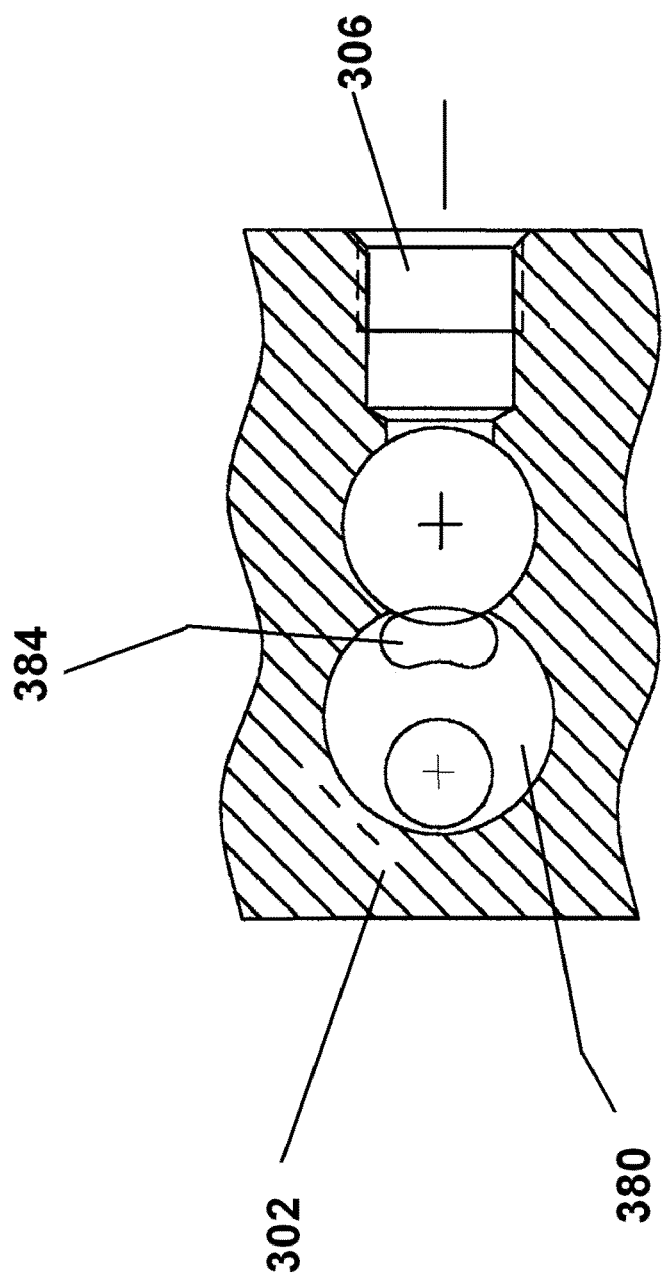
FIG. 19 is a fragmentary cross sectional view taken along line 19-19 in FIG. 18.

An exhaust plenum chamber 380 is formed in the valve body 302 below the exhaust valve seat and in the open position communicates with the exhaust port. The exhaust plenum chamber 380 is sealed by a circular cover member 382 and sealed as described with reference to the prior embodiment. Referring to FIG. 19, a cross passage 384 is formed at the outer periphery of the exhaust plenum chamber and established a fluid path extending serially from the outlet port 306 to the cross passage to the exhaust plenum chamber 380 to the exhaust port.

Each piston is carried in a valve cap threadedly connected in a bore extending from the top surface of the valve body coaxial with the exhaust valve seat. The valve caps are fluidly connected with branch pilot lines 323 above the piston.

Referring to Valve A in FIG. 18 illustrating a three way valve functionality, the exhaust valve 370 is connected at the branch pilot line with a normally open solenoid valve 400 connected with the main pilot line 402. The inlet valve 360 is connected at the branch pilot line with a normally closed solenoid valve 404 connected with the main pilot line.

The outlet port 306 is formed in the side of the valve body 302 and intersects the inlet valve bore above the inlet valve seat. The device port is fluidly connected by line to one side of a single acting actuator 410, including return spring biased piston 411, by lines 412 and 414.

In operation, the inlet valve member 360 is moved upwardly to an open position by inlet pressure on the lower surface thereby shifting the piston to a raised position, establishing a fluid path through outlet port 306 and lines 412, 414 and extending actuator piston 411. The outlet valve member is shifted by the piston to the closed position sealing flow to the outlet port. To retract the piston, the solenoid valves are reversed, whereby the inlet valve member 360 is closed, the outlet pilot pressure removed allowing pressure conditions in the plenum 380 to move the exhaust valve member 370 to the open position and venting the actuator to the exhaust port 312 thereby retracting the actuator piston under the spring biasing.

For four way simulation according to the invention, Valve B is operatively coupled with Valve A. Valve B has a normally open inlet solenoid valve 420 and a normally closed exhaust solenoid valve 422. Valve A is coupled with one end of a double acting actuator 430, including piston 431, by lines 412, 432. Valve B is couple at the outlet port with the other end of the actuator 430 by line 434.

In operation, the extension of actuator is controlled by Valve A as above described, and Valve B is in the exhaust mode. To retract the actuator piston 431, Valve A is conditioned for exhaust and Valve B is conditioned for pressure, thereby shifting the piston 431 to the retracted position.

Figure 20:
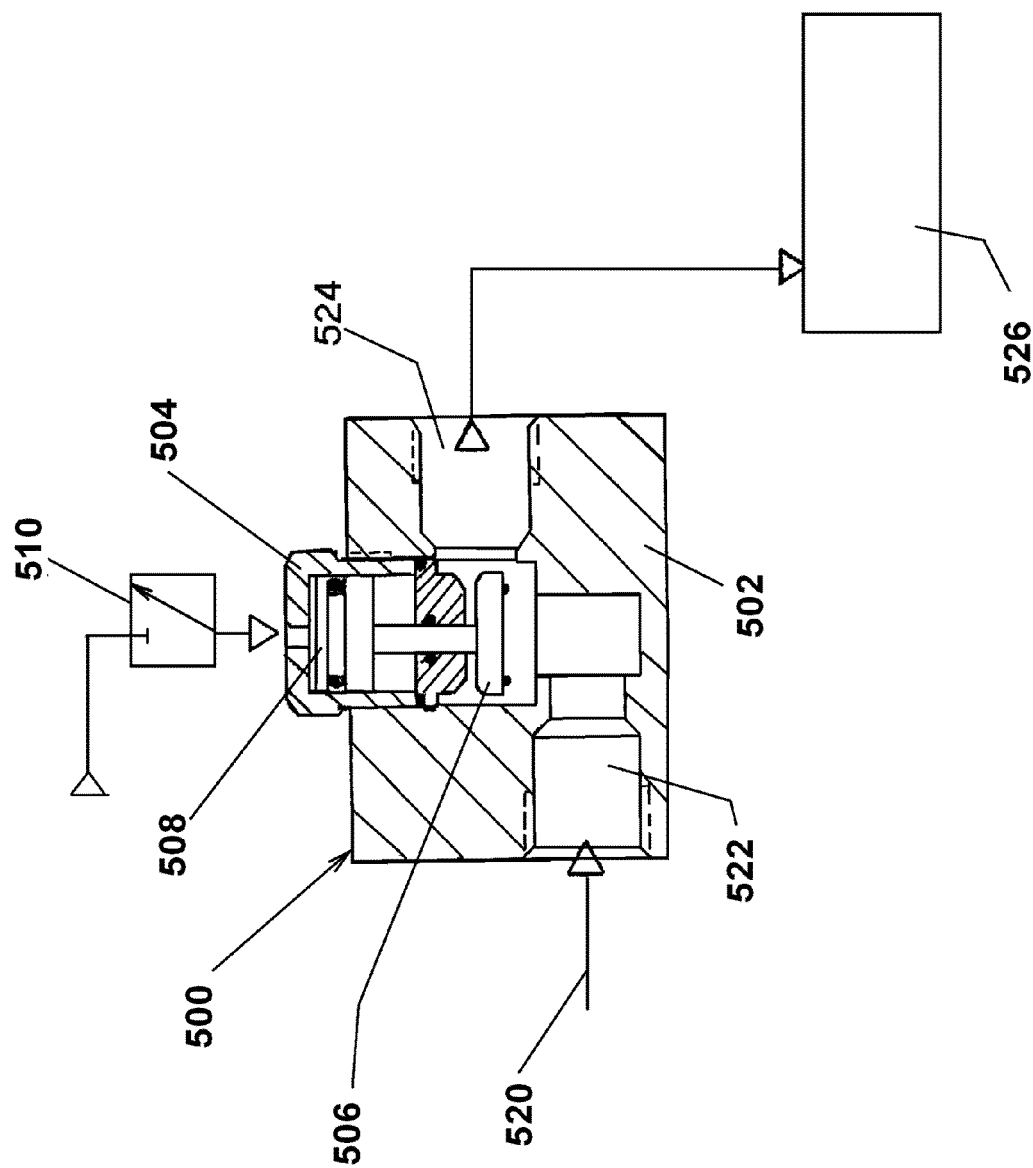
FIG. 20 is a cross sectional view of a valve manifold according another embodiment of the invention illustrating a two way valve functionality.

Referring to FIG. 20, the valve manifold of the present invention may also provide two way valve functionality. Therein, a valve 500 includes a valve body 502 carrying a valve assembly 504 as described above. The inlet valve member 506 is moved by piston 508 under pilot conditions controlled by normally open solenoid valve 510 between a lower closed position engaging the inlet valve seat and the illustrated raised open position. In the open position with the solenoid vented, the valve permits fluid flow from supply line 520 to inlet port 522 past valve member 506 to outlet port 524 to a pressure dependent device 526. Upon reversal of the solenoid valve 510, the pilot pressure is applied to the piston to closed the valve member and block flow therethrough. At the next actuation, the inlet pressure shifts the valve member to the open condition.

With the above constructions, it will be appreciated that the individual valve members may be independently controlled and sequenced to a desired actuation schedule. In particular for spool valve simulation, the normal crossover time between valve positions may be eliminated by concurrent actuator of the solenoids. Should staged actuation be desired, time sequencing may be used. Further the valve ports may be integrated with other flow control. Each such simulation provides the compact size afforded by the valves directly place in the manifold bodies, and the low pilot pressures required by the valves, as well as the valve opening pressures afforded by resident pressurization.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed is:

1. A valve assembly, comprising:
a valve body having a bore including an upper end, a lower end and an intermediate annular valve seat, and the valve body includes a first portion and a second portion attached to the first portion, wherein the first portion includes the first port and the second portion includes the second port, and the first portion includes one of an externally threaded portion and an internally threaded portion and the second portions includes the other of the externally threaded portion and the internally threaded portion and the internally threaded portion engages the externally threaded portion to define the valve body;
a first port fluidly connected at one end of the bore and a second port connected at the other end of the bore;
a valve member slidably carried by a cover member sealing the bore and moveable between a closed position engaging the valve seat and blocking fluid flow through the second port and an open position permitting fluid flow through the second port, wherein a longitudinal axis of the valve member is coaxial with the first port and the second port;
a piston member slidably carried in the bore for moving the valve member to the closed position under pressurized conditions; and
a control for selectively applying pressurized conditions to the piston member for effecting the closed position and reversely conditioned for removing the pressurized conditions and permit movement of the valve member to the open position by pressure conditions in the lower end of the bore, thereby providing two way valve functionality.

2. The valve assembly as recited in claim 1 wherein the valve member includes a poppet having a valve stem;
wherein an end of the valve stem is engageable with a surface of the piston member.

3. The valve assembly as recited in claim 1 wherein the valve stem is received in an opening in the cover member and is supported by the cover member.

4. The valve assembly as recited in claim 1 wherein the valve seat is coaxial with the second port.

5. The valve assembly as recited in claim 1 wherein a pilot pressure line is in fluid communication with the first port.

6. The valve assembly as recited in claim 5 wherein, when pilot pressure is applied, the piston member moves and the valve member shifts to the closed position.

7. The valve assembly as recited in claim 5 wherein, when pilot pressure is removed, the piston member moves and the valve member shifts to the open position.

8. The valve assembly as recited in claim 1 wherein there are four valve assemblies, and a low pressure valve unit is fluidly connected by a first line to a low pressure source, a high pressure valve unit is fluidly connected by a second line to a high pressure source, an exhaust valve unit is fluidly connected by a third line to an exhaust port, and an isolation valve unit is fluidly connected by a fourth line to another exhaust port.

9. The valve assembly as recited in claim 8 wherein the four valve assemblies are housed in a valve block.

10. The valve assembly as recited in claim 1 wherein the piston member and the valve member are separate components.

11. The valve assembly as recited in claim 1 wherein a longitudinal axis of the piston member is coaxial with the first port, the second port, and the longitudinal axis of the valve member.

12. The valve assembly as recited in claim 1 wherein the valve body includes a first portion and a second portion attached to the first portion, wherein the first portion includes the first port and the second portion includes the second port.

13. The valve assembly as recited in claim 12 wherein the piston member is located in the first portion of the valve body, and a seal located between the piston member and the first portion of the valve body is slidably carried on an interior surface of the first portion of the valve body during movement of the piston member in the first portion of the valve member.

14. The valve assembly as recited in claim 12 wherein the first portion of the valve body includes angularly disposed vent holes.

15. The valve assembly as recited in claim 12 wherein an outer rim of the cover member is located between the first portion and the second portion of the valve body.

16. The valve assembly as recited in claim 1 wherein a flat surface surrounding the second port defines the valve seat.

17. The valve assembly as recited in claim 1 wherein a seal is located between the valve stem and the cover.

18. The valve assembly as recited in claim 1 wherein the piston member, the valve member, and the cover are separate components.

19. A valve assembly, comprising:
a valve body having a bore including an upper end, a lower end and an intermediate annular valve seat, wherein the valve body includes a first portion and a second portion attached to the first portion, and the first portion includes one of an externally threaded portion and an internally threaded portion and the second portions includes the other of the externally threaded portion and the internally threaded portion and the internally threaded portion engages the externally threaded portion to define the valve body;
a first port fluidly connected at one end of the bore and a second port connected at the other end of the bore, wherein the first portion includes the first port and the second portion includes the second port;
a valve member slidably carried by a cover member sealing the bore and moveable between a closed position engaging the valve seat and blocking fluid flow through the second port and an open position permitting fluid flow through the second port, wherein a longitudinal axis of the valve member is coaxial with the first port and the second port;
a piston member slidably carried in the bore for moving the valve member to the closed position under pressurized conditions;
a control for selectively applying pressurized conditions to the piston member for effecting the closed position and reversely conditioned for removing the pressurized conditions and permit movement of the valve member to the open position by pressure conditions in the lower end of the bore, thereby providing two way valve functionality; and
a pilot pressure line in fluid communication with the first port.

20. The valve assembly as recited in claim 1 wherein the valve member includes a poppet having a valve stem;
wherein an end of the valve stem is engageable with a surface of the piston member.

21. The valve assembly as recited in claim 19 wherein, when pilot pressure is applied, the piston member moves and the valve member shifts to the closed position, and wherein, when pilot pressure is removed, the piston member moves and the valve member shifts to the open position.

22. The valve assembly as recited in claim 19 wherein the valve stem is received in an opening in the cover member and supported by the cover member.

23. The valve assembly as recited in claim 19 wherein the piston member and the valve member are separate components.

24. The valve assembly as recited in claim 19 wherein a longitudinal axis of the piston member is coaxial with the first port, the second port, and the longitudinal axis of the valve member.

25. The valve assembly as recited in claim 19 wherein the piston member is located in the first portion of the valve body, and a seal located between the piston member and the first portion of the valve body is slidably carried on an interior surface of the first portion of the valve body during movement of the piston member in the first portion of the valve member.

26. The valve assembly as recited in claim 19 wherein the first portion of the valve body includes angularly disposed vent holes.

27. The valve assembly as recited in claim 19 wherein an outer rim of the cover member is located between the first portion and the second portion of the valve body.

28. The valve assembly as recited in claim 19 wherein a flat surface surrounding the second port defines the annular seat.

29. The valve assembly as recited in claim 19 wherein a seal is located between the valve stem and the cover.

30. The valve assembly as recited in claim 19 wherein the piston member, the valve member, and the cover are separate components.

* * * * *

UNITED STATES PATENT AND TRADEMARK OFFICE
CERTIFICATE OF CORRECTION

PATENT NO. : 8,177,188 B1
APPLICATION NO. : 12/131092
DATED : May 15, 2012
INVENTOR(S) : Johnson et al.

Page 1 of 1

It is certified that error appears in the above-identified patent and that said Letters Patent is hereby corrected as shown below:

IN THE CLAIMS:

Claim 2, column 9, lines 3-5: delete "wherein the valve member includes a poppet having a valve stem; wherein an end of"

Claim 20, column 10, lines 28-30: delete "the valve member includes a poppet having a valve stem; wherein an end of"

Signed and Sealed this
Eleventh Day of September, 2012

David J. Kappos
*Director of the United States Patent and Trademark Office*